United States Patent [19]

Mochizuki et al.

[11] Patent Number: 5,115,004
[45] Date of Patent: May 19, 1992

[54] POLYESTER RESIN MOLDING COMPOSITIONS AND MOLDED ARTICLES FORMED OF THE SAME

[75] Inventors: Mitsuhiro Mochizuki; Mitsuo Wada; Hiromitsu Seitou, all of Shizuoka, Japan

[73] Assignee: Polyplastics Co., Ltd., Osaka, Japan

[21] Appl. No.: 744,500

[22] Filed: Aug. 14, 1991

[30] Foreign Application Priority Data

Aug. 14, 1990 [JP] Japan .................................. 2-214744
Apr. 8, 1991 [JP] Japan .................................. 3-73439

[51] Int. Cl.$^5$ .............................................. C08K 5/15
[52] U.S. Cl. .................................... 524/107; 524/318
[58] Field of Search ................ 524/107, 111, 112, 318

[56] References Cited

FOREIGN PATENT DOCUMENTS 0081586  7/1978  Japan .................................. 524/318
0011554  1/1985  Japan .................................. 524/318

Primary Examiner—Paul R. Michl
Assistant Examiner—LaVonda R. DeWitt
Attorney, Agent, or Firm—Nixon & Vanderhye

[57] ABSTRACT

Polyester resin molding compositions exhibiting exceptional low temperature physical properties (i.e., flexibility and toughness) and satisfactory mold-release properties include a melt-blend of a polyester base resin (preferably one which predominantly contains polybutylene terephthalate units), a polyester elastomer (preferably a copolyester having hard and soft segments), and a mold-release effective amount of a sorbitan ester (preferably an ester reaction product of a sorbitan with fatty acid having at least 12 carbon atoms). The sorbitan ester most preferably has a hydroxyl value of between 50 to 400, exclusive, so that blooming during injection molding operations (e.g., a predrying stage) is minimized (if not eliminated entirely). Molded articles formed of the compositions of this invention may be used in a variety of applications, for example, as parts for the automotive and/or electronics industries.

13 Claims, No Drawings

POLYESTER RESIN MOLDING COMPOSITIONS AND MOLDED ARTICLES FORMED OF THE SAME

FIELD OF INVENTION

The present invention generally relates to moldable polyester resin compositions and molded articles of the same. More specifically, the present invention relates to polyester resin compositions which exhibit exceptional low-temperature toughness, injection moldabiliy, mold release and extruder screw bite characteristics.

BACKGROUND AND SUMMARY OF THE INVENTION

Crystalline thermoplastic polyester resins, such as polyalkylene terephthalate resins, have been used extensively as an engineering plastic in various fields owing to their excellent mechanical and electrical properties, as well as their physical and chemical characteristics and relative processing ease. Thus, thermoplastic polyester resins have been used to form molded parts including automotive, electrical and electronic applications.

Diversifying the end-use applications for thermoplastic polyester resins, however, often requires specific performance and/or property characteristics. For example, it is desirable for parts used in the automotive industry to exhibit specific mechanical properties in terms of low temperature flexibility and impact resistance so as to meet automotive safety standards.

Polyester resins have previously been blended with a thermoplastic elastomeric resin, such as an olefin polymer, or a relatively more "rubbery" polymer in an attempt to obtain satisfactory low temperature properties. Although polyester resins blended with an elastomeric resin typically will exhibit some improvement in low temperature properties, the resulting polyblend composition is highly susceptible to surface peeling due to poor compatibility between the polyester and elastomeric resin components.

Furthermore, polyester resins are known generally for their excellent processability and moldabiliy. However, the coexistence of an elastomeric resin with a polyester base resin tends to deteriorate the mold-release properties of the composition. Decreased mold-release properties (as compared to polyester resins generally) may lead to deformation, cracking and the like of articles molded from the resin. These problems are especially acute when articles having a relatively complex shape, small size and/or small wall thickness ar attempted to be molded.

In order to counteract the moldabiliy problems encountered with blends of polyester and elastomeric resins, paraffin oils, fatty acid amides, fatty acid esters and the like have been melt-blended with polyester compositions as mold-release agents. Polyester resins which include such conventional mold-release agents do exhibit improvements in their mold release properties, but typically will exhibit poor extruder screw "bite" (and thus slippage on the extruder screw) during injection molding due to blooming of the mold release agents which occurs during a preliminary pellet drying stage. As a result, insufficient plasticization of the resin composition requiring additional time for the screw extrusion stage occurs. As a result, molded articles of consistent quality can typically not be produced over a period of time.

Recycling of resin scrap has, in recent years, gained significant importance not only from an environmental point of view, but also form an economic point of view for resin manufacturers and molding operators. Reuse of scrap resin, however, only exacerbates the poor extruder screw "bite" characteristics of the virgin resin which include conventional mold-release agents. While the problems of poor extruder bite can sometimes be ameliorated to a certain extent by the application of a metallic soap to the surface of resin pellets prior to the extrusion operation, such a procedure is necessarily more costly since an additional process step is required. Furthermore, metallic soaps are corrosive requiring more frequent equipment maintenance and/or replacement, and can also be an environmental problem within the molding plant requiring complex (and costly) recovery schemes.

What has been needed in the art, therefore, is a polyester molding compositions that not only exhibits exceptional low temperature physical properties (e.g., flexibility and toughness), but also has excellent mold-release properties so that articles of relatively complex shape, small size and/or small wall thickness can be made. It is towards satisfying such a need that the present invention is directed.

The present invention is embodied in polyester molding compositions which exhibit excellent low-temperature properties, especially low-temperature toughness, and improved moldabiliy, especially mold-release properties. Pellets formed of the compositions of this invention furthermore exhibit satisfactory extruder screw "bite" during prolonged injection molding operations so that consistent molded articles of complex shapes, small sizes and/or small wall thickness can be made.

The compositions of the present invention are broadly characterized by a melt-blend of a crystalline polyester base resin, a polyester elastomer and a sorbitan ester. More specifically, the compositions of this invention are characterized by a melt-blend of (A) a crystalline thermoplastic polyester base resin, (B) between 1 to 50 parts by weight, based on the weight of the polyester base resin, of a polyester elastomer, and (C) a mold-release effective amount of between about 0.01 to 10 parts by weight, based on the total composition weight, of a sorbitan ester which is the reaction product of a sorbitan with at least a 12 carbon atom fatty acid. Most preferably, the sorbitan ester mold-release agent has a hydroxyl value of between 50 and 400 so that blooming during predrying stages of an injection molding operation is minimized (if not eliminated entirely).

Further aspects and advantages of this invention will become more clear after careful consideration is given to the detailed description of the preferred exemplary embodiments thereof which follow.

DETAILED DESCRIPTION OF THE PREFERRED EXEMPLARY EMBODIMENTS

At the outset, the term "crystalline thermoplastic polyester resin" as used in the specification and in the accompanying claims is intended to mean a crystalline polyester which is the polycondensation reaction product of a dicarboxylic acid with a low molecular weight dihydroxy compound, a hydroxy carboxylic acid compound, or a mixture of such components. The term "crystalline thermoplastic polyester resin" furthermore includes polyester homopolymers and copolymers.

Examples of the dicarboyxlic acid compound that may be employed to form the crystalline thermoplastic polyester resin include substituted and unsubstituted dicarboxylic acids, such as terephthalic, isophthalic, naphthalenedicarboxylic, diphenylcarboxylic, diphenyletherdicarboxylic, diphenylethanedicarboxylic, cyclohexanedicarboxylic, adipic and sebacic acids. It is also possible to use the dicarboyxlic acid compounds for polymerization in the form f their ester-forming derivatives, for example, in the form of a lower alcohol ester, such as dimethyl ester. A mixture of two or more dicarboxylic acid compounds may be used during polymerization.

The dihydroxy compounds that may be used to form the crystalline thermoplastic polyester resin used in the compositions of the present invention include substituted or unsubstituted hydroxy compounds such as ethylene glycol, propylene glycol, butanediol, neopentyl glycol, hydroquinone, resorcinol, dihydroxyphenyl, naphthalenediol, dihydroxydiphenyl ether, cyclohexanediol, 2,2-bis(4-hydroxyphenyl)propane, and diethoxylated bisphenol A. These compounds may also be used alone or in the form of a mixture of two or more of the same.

Examples of the hydroxycarboxylic acid include substituted or unsubstituted hydroxycarboxylic acids such as hydroxybenzoic, hydroxynaphthoic and diphenyleneoxycarboxylic acids, as well as their ester-forming derivatives. Again, these compounds may be used alone or as a mixture of two or more of the same.

The crystalline thermoplastic polyester thermoplastic resin may have a branched or crosslinked structure formed using the monomers described above in combination with a minor amount of another trifunctional monomer, such as trimellitic acid, trimesic acid, pyromellitic acid, pentaerythritol and trimethylolpropane.

Virtually any crystalline thermoplastic polyester resin formed by polycondensation using the monomer components described above can be employed as the polyester base resin in the compositions of the present invention. The polyester base resin is preferably a resin which is comprised mainly of polyalkylene terephthalate units in the polymer backbone, still preferably a resin which is comprised mainly of polybutylene terephthalate units.

The polyester elastomer component used in the compositions of the present invention is a copolymer having repeating hard and soft segments preferably connected head-to-tail through ester linkages. The hard segment of the copolyester elastomer is a polyester derived from a low molecular weight diol, whereas the soft segment is an ester of a polyether diol having a number-average molecular weight of between about 200 to 6000. The ratio of the hard segments to the soft segments in percent by weight of the copolyester elastomer is preferably 1:99 to 99:1, and more preferably 5:95 to 95:5.

Specific examples of the dicarboxylic acid moiety constituting the polyester hard segment include aromatic dicarboxylic acids such as terephthalic acid, isophthalic acid, 2,6- and 1,5-naphthalenedicarboxylic acids, and bis(p-carboxyphenyl)methane, aliphatic dicarboxylic acids such as 1,4-cyclohexapedicarboxylic and cyclopentanedicarboxylic and cyclopentanedicarboxylic acids, and aliphatic dicarboxylic acids such as adipic and sebacic acids. From the viewpoint if mechanical properties and heat resistance, it is preferred that the aromatic dicarboxylic acid be employed in an amount of at least 5 mole %. The dicarboxylic acid moiety is most preferably selected from terephthalic and isophthalic acids.

The diol moiety constituting the hard segment in the copolyester elastomer includes aliphatic and alicyclic diols having 2 to 12 carbon atoms, such as ethylene glycol, propylene glycol, 1,4-butanediol, 1,4-butenediol, neopentyl glycol, 1,5-pentanediol and 1,6-hexanediol, and bisphenols such as bis(p-hydroxy)-diphenyl, bis(p-hydroxyphenyl)methane and bis(p-hydroxyphenyl)-propane, and mixtures thereof. Among these diol moieties, aliphatic diols having 2 to 8 carbon atoms are particularly preferred.

The acid moiety used to form the hard segment may also be used as the carboxylic acid moiety which forms the soft segment of the copolyester elastomer. On the other hand, polyether diols, particularly poly(alkylene oxide) glycol, may suitably be used as the diol moiety, with specific examples thereof including poly(ethylene oxide) glycol, poly(1,3- and 1,2-propylene oxide) glycol, poly(tetramethylene oxide) glycol, polyethylene oxide/polypropylene oxide block copolymer glycol and polyethylene oxide/poly-(tetramethylene oxide) block copolymer glycol. Among them, poly(tetramethylene oxide) glycol is particularly preferred. These components may furthermore be used in combinations of two or more of the same. The average molecular weight of the polyether glycols ranges from between about 200 to 6000. Although the copolyester component can be prepared by any suitable polymerization procedure well known to those in this art, many copolyester elastomers are commercially available and may be used in the compositions of this invention.

A particularly preferred copolyester elastomer component is one having hard segments comprised of polyethylene terephthalate, polybutylene terephthalate or polybutene terephthalate, and soft segments comprised of a terephthalate and/or isophthalate of polyethylene oxide glycol or polybutylene oxide glycol having a molecular weight of 200 to 6000.

The crystalline thermoplastic polyester base resin and the copolyester elastomer are preferably blended in amounts between 50 to 99 parts by weight and 1 to 50 parts by weight, respectively, and more preferably 60 to 97 parts by weight and 3 to 40 parts by weight, respectively based on 100 parts by weight of the total of the polyester base and elastomer resins. When the amount of the copolyester elastomer exceeds 50 parts by weight, the rigidity of the resin composition is reduced to a considerable extent. On the other hand, when the amount of the copolyester elastomer is less than 1 part by weight, insufficient improvements in the impact resistance of the compositions are attained.

The sorbitan ester component in the compositions of this present invention is an aliphatic acid ester which is the reaction product of a sorbitan and a fatty acid having 12 or more carbon atoms. Examples of the fatty acid moiety having 12 or more carbon atoms which constitutes the ester include lauric, oleic, palmitic, stearic, behenic and montanoic acids. The number of carbon atoms in the fatty acid chain is preferably 16 to 32, and most preferably 18 to 22. When the number of carbon atoms in the fatty acid chain is less than 12, no significant improvement in the mold release properties of the composition can be attained. On the other hand, when the number of carbon atoms exceeds 32, the heat resistance of the composition is often reduced t undesirable levels.

The sorbitan ester used in the compositions of the present invention can be prepared by any known method. The sorbitan ester is preferably one that is adjusted so as to have a hydroxyl value of between 50 to 400, exclusive, as determined by the pyridine-acetic anhydride method established by The Japan Oil Chemists' Society (Standard Methods for the Analysis of Oils, Fats and Derivatives: 2, 4, 9, 2–71 Hydroxyl Value). The hydroxyl value of the sorbitan ester is preferably between about 100 to 300, and more preferably between about 150 to 300. When the hydroxyl value of the sorbitan ester is less than 50, blooming is observed when pellets of the compositions are dried which causes inconsistent metering times during molding thereby resulting in unstable and/or inconsistent molding operations. On the other hand, when the hydroxyl value is 400 or more, the heat resistance and other properties of the composition are unfavorably reduced.

Preferred specific examples of the sorbitan ester include monopalmitate, monostearate, distearate, tristearate, monobehenate, dibehenate, tribehenate and monomontanate. The most preferred examples of the sorbitan ester are those esters of sorbitan with stearic or behenic acid, such as monostearate, distearate, monobehenate and dibehenate.

The compositions of this invention preferably include the sorbitan ester component in an amount, based on 100 parts by weight of the polyester base resin and polyester elastomer resin components, of between about 0.01 to 10 parts by weight, preferably between about 0.05 to 5 parts by weight, and most preferably between about 0.1 to 2 parts by weight. When the amount of the sorbitan ester component is excessively small, little improvement in the extruder screw "bite" into the pellets is obtained. On the other hand, when the amount of the sorbitan ester is excessively large, the mechanical properties of the composition are unfavorably reduced.

It is also possible to use the resin composition of the present invention in combination with a minor amount of an auxiliary thermoplastic resin in amounts such that the desired properties of the composition are not affected. The auxiliary thermoplastic resins that may be used in the compositions of this invention include virtually any thermoplastic resin that is stable at high temperature.

Examples of auxiliary thermoplastic resins include polyamides, ABS, polyphenylene oxides, polyalkyl acrylates, polyacetals, polysulfones, polyethersulfones, polyetherimides, polyetherketones and fluororesins. These thermoplastic reins may also be used in the form of a mixture of two or more such resins.

The compositions of the present invention may further be blended with known additives and agents generally used with thermoplastic engineering resins. For example, stabilizers such as antioxidants, heat stabilizers and ultraviolet absorbers, antistatic agents, flame retardants, colorants such as dyes and pigments, lubricants, plasticizers, crystallization accelerators, nucleating agents and inorganic fillers may be employed so as to impart desired properties to the resin composition in dependence upon its intended use.

Examples of inorganic fillers include inorganic fibers such as fibers of glass, carbon, ceramic, boron, potassium titanate and asbestos, and particulate fillers, flaky inorganic compounds and whiskers, such as calcium carbonate, highly dispersive silicates, alumina, aluminum hydroxide, talc, clay, mica, glass flake, glass powder, glass bead, quartz powder, quartz sand, wollastonite, carbon black, barium sulfate, plaster of Paris, silicon carbide, alumina, boron nitride and silicon nitride. These inorganic fillers may be used alone or in the form of a mixture of two or more of the same.

The compositions of the present invention can easily be prepared using apparatus and techniques conventionally used to prepare engineering polyblends generally. For example, the components may be mixed, and kneaded, with the mixture then being extruded by means of a screw extruder so as to prepare pellets. The pellets may thereafter by molded to form articles. Alternatively, pellets having different compositions may be premixed in preselected amounts to form a mixture which is thereafter molded. Furthermore, at least one of the components may be fed directly into a suitable molding machine. The compositions may also be prepared by a technique whereby a part of the resin components is mixed in the form of a fine powder with the other components prior to extrusion and/or molding. This latter technique is especially preferred since the components are more homogeneously blended with one another.

The present invention will be described in greater detail by referring to the following non-limiting Examples.

EXAMPLES

The following methods of evaluation were used in the Examples:

(1) Hydroxyl Value

The hydroxyl value was measured by Standard Methods for the Analysis of Oils, Fats and Derivatives: 2, 4, 9, 2-71 Hydroxyl Value (pyridine-acetic anhydride method) established by The Japan Oil Chemists' Society.

(2) Evaluation of Bite into the Pellets (variation in metering time)

A box (75 mm$^d \times$40 mm$^w \times$40 mm$^h \times$2 mm$^t$) was formed under the following conditions to measure metering time (plasticizing time). The lower the average value or the smaller the variation, the better the extruder screw "bite" into pellets. The results are given on an average value, maximum value and minimum value for 200 shot moldings.

The evaluation was conducted on two kinds of pellets, i.e., a fresh pellet immediately after its preparation, and a pellet containing 50% of a regenerated material (a material pulverized after molding). A Toshiba IS30-EPN molding machine was used and operated under the following conditions.

cylinder temperature: 260—250—240—240° C.
(nozzle)   (H3) (H2) (H1)

mold temperature: 60° C.
number of revolutions of screw: 160 rpm (3) Releasability During molding of the same article as that formed for use in evaluations the extruder-screw bite into the pellets, the deformation of a molded article caused by the mold's ejector pin was evaluated according to the following qualitative ranks:
  ○: free from deformation
  Δ: slight deformation
  x: large deformation (4) Appearance of Molded Article (mold-release agent blooming)

A flat plate (50 mm×50 mm; thickness 3 mm) was formed and aged at 120° C. for 100 hr. The surface change due to blooming was visually observed and the appearance was evaluated according to the following qualitative ranks:
1 ... no change of surface gloss
2 ... slight reduction of surface gloss
3 ... significant reduction of surface gloss
4 ... significant reduction of surface gloss and slight blooming
5 ... significant blooming on the surface, and considerable reduction of surface gloss.

(5) Tensile elongation

The tensile elongation was measured according to ASTM D-638 through the use of an ASTM No. 4 dumbbell (thickness: 1 mm). The evaluation was conducted both at room temperature (23° C.) and low temperature (0° C.).

EXAMPLES 1 to 10 and COMPARATIVE EXAMPLES 1 to 6

Compositions were prepared by blending polybutylene terephthalate as component (A) with various polyester elastomers as component (B) and sorbitan esters as component (C) in proportions specified in Table 1. The blend was melt-kneaded by means of a twin-screw extruder to prepare pellets, with the pellets then being injection molded into test pieces for use in evaluations. For comparison, as described in Table 2, the same evaluations were conducted on a test piece containing no sorbitan ester and one containing a fatty acid amide or other fatty acid ester.

The results are given in Tables 1 and 2.

TABLE 1

| Composition / Properties | | | unit | Ex. No. 1 | 2 | 3 | 4 | 5 | 6 | 7 | 8 | 9 | 10 |
|---|---|---|---|---|---|---|---|---|---|---|---|---|---|
| Composition | (A)*1 | A-1 | pts. wt. | 90 | 90 | 90 | 80 | 90 | 90 | 90 | 90 | 90 | |
| | | A-2 | " | | | | | | | | | | 90 |
| | (B)*2 | B-1 | " | 10 | 10 | 10 | 20 | | 10 | 10 | 10 | 10 | 10 |
| | | B-2 | " | | | | | 10 | | | | | |
| | (C) | sorbitan monostearate (hydroxyl value: 260) | " | 0.1 | 0.3 | 0.5 | 0.3 | 0.3 | | | | | 0.3 |
| | | sorbitan distearate (hydroxyl value: 190) | " | | | | | | 0.3 | | | | |
| | | sorbitan monobehenate (hydroxyl value: 205) | " | | | | | | | 0.3 | | | |
| | | sorbitan tribehenate (hydroxyl value: 70) | " | | | | | | | | 0.3 | | |
| | | sorbitan monomontanate (hydroxyl value: 285) | " | | | | | | | | | 0.3 | |
| Properties | | bite into pellets (metering time) 1st run of molding x̄ | sec | 2.1 | 2.3 | 2.4 | 2.2 | 2.3 | 2.3 | 2.2 | 2.2 | 2.8 | 2.3 |
| | | MAX | " | 2.4 | 2.5 | 2.7 | 2.5 | 2.6 | 2.5 | 2.5 | 2.6 | 3.4 | 2.4 |
| | | MIN | " | 1.8 | 1.8 | 1.9 | 1.9 | 1.9 | 1.9 | 1.8 | 1.9 | 2.1 | 1.9 |
| | | incorporation of 50% of regenerated material x̄ | sec | 2.5 | 2.5 | 2.7 | 2.9 | 2.6 | 2.7 | 2.8 | 6.1 | 3.4 | 2.4 |
| | | MAX | " | 3.8 | 3.2 | 3.9 | 4.3 | 3.2 | 3.9 | 4.1 | 7.5 | 4.2 | 3.3 |
| | | MIN | " | 2.0 | 2.0 | 2.1 | 2.1 | 2.0 | 2.1 | 2.5 | 2.1 | 2.2 | 2.0 |
| | | appearance test (after aging at 120° C. for 100 hr) | — | 1 | 1 | 1 | 1 | 1 | 1 | 1 | 2 | 1 | 1 |
| | | releasability | — | o | o | o | o | o | o | o | o | o | o |
| | | tensile elongation (at room temp.) | % | 220 | 220 | 220 | 240 | 225 | 220 | 220 | 220 | 225 | 205 |
| | | tensile elongation (at 0° C.) | % | 125 | 120 | 118 | 185 | 120 | 125 | 120 | 108 | 115 | 115 |

TABLE 2

| | | | unit | Ex. No. 1 | 2 | 3 | 4 | 5 | 6 |
|---|---|---|---|---|---|---|---|---|---|
| Composition | (A)*1 | A-1 | pts. wt. | 90 | 100 | 90 | 90 | 90 | |
| | | A-2 | " | | | | | | 90 |
| | (B)*2 | B-1 | " | 10 | | | 10 | 10 | 10 |
| | | B' | " | | | 10 | | | |
| | (C) | sorbitan monostearate (hydroxyl value: 260) | " | | | 0.3 | 0.3 | | |
| | | ethylenebisstearylamide (hydroxyl value: 0) | " | | | | | 0.3 | |
| | | stearyl stearate (hydroxyl value: 3) | " | | | | | | 0.3 |
| Properties | | bite into pellets (metering time) 1st run of molding x̄ | sec | 2.4 | 2.4 | 2.3 | 12.0 | 11.0 | 2.6 |
| | | MAX | " | 2.5 | 2.6 | 2.6 | 19.0 | 21.7 | 2.8 |
| | | MIN | " | 1.9 | 1.9 | 1.9 | 4.8 | 4.3 | 2.0 |

TABLE 2-continued

|  |  |  | unit | Ex. No. 1 | 2 | 3 | 4 | 5 | 6 |
|---|---|---|---|---|---|---|---|---|---|
| incorporation of | $\bar{x}$ |  | sec | 3.7 | 2.4 | 2.4 | 17.5 | 16.6 | 3.9 |
| 50% of regenerated | MAX |  | " | 4.9 | 3.3 | 3.6 | 29.8 | 24.8 | 4.7 |
| material | MIN |  | " | 2.9 | 2.1 | 2.0 | 7.6 | 6.0 | 2.8 |
| appearance test (after aging at 120° C. for 100 hr) |  |  | — | 1 | 1 | 1 | 5 | 4 | 1 |
| releasability |  |  | — | x | o | o | o | c | x |
| tensile elongation (at room temp.) |  |  | % | 220 | 190 | 160 | 220 | 220 | 210 |
| tensile elongation (at 0° C.) |  |  | % | 120 | 40 | 20 | 120 | 120 | 110 |

Note:
*[1]A-1: polybutylene terephthalate
A-2: a polyblend of 75 parts of polybutylene terephthalate (A-1) and 25 parts by weight of polyethylene terephthalate
*[2]B-1: A polyester elastomer comprising a polybutylene terephthalate segment and a polytetramethylene oxide terephthalate segment
B-2: a polyester elastomer comprising a polybutylene terephthalate segment, a polybutene terephthalate segment and a polytetramethylene oxide terephthalate
B': an ethylene-propylene copolymer elastomer As is apparent from the foregoing description and Examples, the polyester resin compositions of the present invention comprised of a crystalline thermoplastic polyester base resin blended with a polyester elastomer and a sorbitan ester exhibit excellent low-temperature toughness and are superior in their extruder screw "bite" into the pellets during molding as compared to conventional resin compositions containing various lubricants and fatty acid amides typically used for similar purposes. The compositions of this invention thus exhibit no reduction in the extruder-screw bite even when regenerated materials are used thereby allowing stable molding operations to be conducted for a prolonged period of time. Moreover, the compositions have excellent mold release characteristics which render them as desirable molding compositions. The compositions of the present invention are thus suitable for use in components having a relatively small wall thickness and/or a complex shape, for example, various gears and connectors for automobiles, electrical equipment and the like.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A polyester resin molding composition comprising a blend of:
   (A) a crystalline polyester base resin;
   (B) between 1 to 50 parts by weight, based on the weight of the polyester base resin, of a polyester elastomer resin; and
   (C) between about 0.01 to 10 parts by weight of a sorbitan ester which is the reaction product of a sorbitan and a fatty acid having at least 12 carbon atoms.

2. A polyester resin molding composition according to claim 1, wherein said crystalline thermoplastic polyester base resin is composed mainly of polybutylene terephthalate.

3. A polyester resin molding composition according to claim 1 or 2, wherein said polyester elastomer resin is a copolyester which includes hard segments comprised of repeating units of a phthalate of a lower aliphatic glycol, and soft segments comprised of a phthalate of a polyalkylene oxide glycol.

4. A polyester resin molding composition according to claim 3, wherein said sorbitan ester has a hydroxyl value of between 50 to 400, exclusive.

5. A polyester resin molding composition according to claim 4, wherein the hydroxyl value of said sorbitan ester is between 150 to 300.

6. A polyester resin molding composition according to claim 1, wherein the fatty acid moiety of said sorbitan ester has between 16 to 32 carbon atoms.

7. A polyester resin molding composition according to claim 1, wherein the sorbitan ester is an ester of a sorbitan with stearic acid or behenic acid.

8. A molded article which consists essentially of a polyester resin molding composition according to claim 1 or 2.

9. A molded article according to claim 8, wherein said polyester elastomer resin is a copolyester which includes hard segments comprised of repeating units of a phthalate of a lower aliphatic glycol, and soft segments comprised of a phthalate of a polyalkylene oxide glycol.

10. A molded article according to claim 8, wherein said sorbitan ester has a hydroxyl value of between 50 to 400, exclusive.

11. A molded article according to claim 10, wherein the hydroxyl value of said sorbitan ester is between 150 to 300.

12. A molded article according to claim 8, wherein the fatty acid moiety of said sorbitan ester has between 16 to 32 carbon atoms.

13. A molded article according to claim 9, wherein the sorbitan ester is an ester of a sorbitan with stearic acid or behenic acid.

* * * * *

UNITED STATES PATENT AND TRADEMARK OFFICE
CERTIFICATE OF CORRECTION

PATENT NO. : 5,115,004
DATED : May 19, 1992
INVENTOR(S) : MOCHIZUKI et al

It is certified that error appears in the above-indentified patent and that said Letters Patent is hereby corrected as shown below:

```
Column 1, line 51, after "thickness" delete "ar" and insert --are--;
          line 53, after "the" delete "moldabiliy" and insert --moldability--;
          line 66, after "occurs" delete "As a result" and insert --Thus--.

Column 2, line 3, after "also" delete "form" and insert --from--;
          line 19, after "molding" delete "compositions" and insert
          --composition--.

Column 3, line 8, after "the" delete "dicarboyxlic" and insert --dicarboxylic--;
          line 9, after "form" delete "f" and insert --of--;
          line 65, after "viewpoint" delete "if" and insert --of--.

Column 4, line 67, after "reduced" delete "t" and insert --to--.

Column 6, line 11, after "thereafter" delete "by" and insert --be--.
```

Signed and Sealed this

Fourteenth Day of December, 1993

*Attest:*

BRUCE LEHMAN

*Attesting Officer*   *Commissioner of Patents and Trademarks*